United States Patent
Hilker

(10) Patent No.: US 11,164,704 B2
(45) Date of Patent: Nov. 2, 2021

(54) MOTOR DEVICE FOR A SWITCH DRIVE OF AN ELECTRIC SWITCH

(71) Applicant: SIEMENS AKTIENGESELLSCHAFT, Munich (DE)

(72) Inventor: Thomas Hilker, Stahnsdorf (DE)

(73) Assignee: Siemens Energy Global GmbH & Co. KG, Munich (DE)

(*) Notice: Subject to any disclaimer, the term of this patent is extended or adjusted under 35 U.S.C. 154(b) by 247 days.

(21) Appl. No.: 16/336,292

(22) PCT Filed: Sep. 5, 2017

(86) PCT No.: PCT/EP2017/072142
§ 371 (c)(1),
(2) Date: Mar. 25, 2019

(87) PCT Pub. No.: WO2018/054672
PCT Pub. Date: Mar. 29, 2018

(65) Prior Publication Data
US 2019/0237274 A1 Aug. 1, 2019

(30) Foreign Application Priority Data
Sep. 23, 2016 (DE) .......................... 102016218334.6

(51) Int. Cl.
*H02P 1/00* (2006.01)
*H01H 3/30* (2006.01)
(Continued)

(52) U.S. Cl.
CPC ............ *H01H 3/3005* (2013.01); *H01H 3/26* (2013.01); *H01H 3/30* (2013.01); *H01H 3/3021* (2013.01);
(Continued)

(58) Field of Classification Search
CPC .. H01H 3/3005; H01H 3/26; H01H 2003/266; H02P 7/03; H02P 27/08; H02P 6/085
See application file for complete search history.

(56) References Cited

U.S. PATENT DOCUMENTS 5,436,784 A   7/1995  Schweitzer, III et al.
5,576,606 A  11/1996  Nguyen Phuoc et al.
(Continued)

FOREIGN PATENT DOCUMENTS

CH            634950 A5    2/1983
DE       102011002685 B3    4/2012
(Continued)

OTHER PUBLICATIONS

Collins, Danielle: "FAQ: How to tune servo systems for high dynamic response?" Blog published Jun. 21, 2016, Internet except WTWH Media LLC, pp. 1-9, URL:https://motioncontroltips.com/faq-tune-servo-system-high-dynamic-response/.
(Continued)

*Primary Examiner* — Karen Masih
(74) *Attorney, Agent, or Firm* — Laurence A. Greenberg; Werner H. Stemer; Ralph E. Locher

(57) ABSTRACT

A motor assembly for a switch drive of an electric switch. The motor assembly has a brushless three-phase motor and an electronic control device for controlling the three-phase motor. The control device has a rectifier unit for rectifying a supply voltage of the motor assembly if the supply voltage is an AC voltage, and for reverse polarity protection if the supply voltage is a DC voltage. The control device also has a voltage measuring unit for detecting a rectifier output voltage of the rectifier unit, a switch unit for generating a pulse width-modulated drive AC voltage for the three-phase
(Continued)

motor from the rectifier output voltage, and a control unit for actuating the switch unit according to the rectifier output voltage.

13 Claims, 3 Drawing Sheets

(51) Int. Cl.
    *H02P 27/08*      (2006.01)
    *H02P 6/08*      (2016.01)
    *H02P 7/03*      (2016.01)
    *H01H 3/26*      (2006.01)

(52) U.S. Cl.
    CPC ............... *H02P 6/085* (2013.01); *H02P 7/03* (2016.02); *H02P 27/08* (2013.01); *H01H 2003/266* (2013.01)

(56) References Cited

U.S. PATENT DOCUMENTS

| | | | |
|---|---|---|---|
| 5,856,736 A | 1/1999 | Rotunda et al. | |
| 6,479,956 B1 * | 11/2002 | Kawabata | H02P 6/085 318/400.12 |
| 7,292,004 B2 | 11/2007 | Ueda et al. | |
| 9,438,097 B2 | 9/2016 | Schwarzmann et al. | |
| 2001/0035731 A1 | 11/2001 | Luerkens | |
| 2003/0098668 A1 | 5/2003 | Jadric et al. | |
| 2004/0184206 A1 | 9/2004 | Nomura et al. | |
| 2005/0116670 A1 | 6/2005 | Lathrop et al. | |
| 2008/0037304 A1 | 2/2008 | Suzuki et al. | |
| 2012/0194110 A1 | 8/2012 | Koenig | |
| 2013/0020804 A1 | 1/2013 | Roesmann et al. | |
| 2015/0115854 A1 | 4/2015 | Pottebaum et al. | |
| 2015/0311853 A1 | 10/2015 | Swamy et al. | |

FOREIGN PATENT DOCUMENTS

| | | |
|---|---|---|
| DE | 102014215059 A1 | 2/2016 |
| EP | 0105077 A1 | 4/1984 |
| EP | 0720193 A1 | 7/1996 |
| EP | 1503491 A2 | 2/2005 |
| EP | 1538499 A2 | 6/2005 |
| FR | 2904469 A1 | 2/2008 |

OTHER PUBLICATIONS

Wikipedia: "Feed forward (control)", Wikipedia Article, published Jun. 8, 2016, pp. 1-7.
Wikipedia: "Positionsschalter" [Position Switch], page last edited on Feb. 29, 2020.

* cited by examiner

MOTOR DEVICE FOR A SWITCH DRIVE OF AN ELECTRIC SWITCH

BACKGROUND OF THE INVENTION

Field of the Invention

The invention relates to a motor device for a switch drive of an electric switch and a method for the operation thereof.

Electric switches for closing or opening current paths of medium and high electrical voltages and currents require a large amount of mechanical energy for moving switching contacts of the switches.

For example, switch drives which store mechanical energy, for example spring energy store drives, are often used for moving the switching contacts of circuit breakers. In a spring energy store drive, a spring, for example a helical spring, is often tensioned by a motor via a gear mechanism. The spring is locked so as to prevent it from being automatically unloaded so that the energy remains stored in the spring. The stored energy can be released by a release device by virtue of the lock of the spring being released so that the spring is unloaded. A switching operation can thus be implemented using the available stored energy.

In contrast to circuit breakers, switch disconnectors effect a defined interruption of almost load-free electrical circuits by virtue of switching contacts being driven directly, for example by a motor. It is not necessary here to store energy since load-free (power-free) disconnection of the switching contacts can take place more slowly.

The electrical supply voltages of electric motors for switch drives of electric switches are diverse owing to normative guidelines and application-dependent requirements and, apart from the voltage level, also differ in terms of the voltage form, which may be, for example, a single-phase or three-phase AC voltage or a DC voltage. Therefore, different motor types and embodiments are used for switch drives of electric switches. Actuation, safety, locking and monitoring functions for the motors are implemented by a multiplicity of component part and wiring variants. The variety of component parts and wiring increases the costs and the failure rate of the installation of the motors.

SUMMARY OF THE INVENTION

The invention is based on the object of specifying a motor device for a switch drive of an electric switch which can be used for various supply voltages of electric motors.

The object is achieved according to the invention by the features of the independent claim.

Advantageous configurations of the invention are the subject matter of the dependent claims.

A motor device according to the invention for a switch drive of an electric switch comprises a brushless three-phase motor and an electronic control device for controlling the three-phase motor. The control device has a rectifier unit for rectifying a supply voltage of the motor device when the supply voltage is an AC voltage and for polarity reversal protection when the supply voltage is a DC voltage. In addition, the control device has a voltage-measuring unit for detecting a rectifier output voltage of the rectifier unit, a switching unit for generating a pulse-width-modulated AC drive voltage for the three-phase motor from the rectifier output voltage, and a control unit for actuating the switching unit depending on the rectifier output voltage.

The motor device can advantageously be operated on different supply voltages, wherein the supply voltages can differ in terms of their amplitude and/or voltage form. The rectifier unit makes it possible to optionally operate on a single-phase or polyphase AC supply voltage and on a DC supply voltage with any desired polarity by virtue of it rectifying an AC supply voltage and providing polarity reversal protection for a DC supply voltage. The generation of a pulse-width-modulated AC drive voltage for the three-phase motor from the rectifier output voltage depending on the rectifier output voltage makes it possible to match the AC drive voltage for the three-phase motor to the respective supply voltage and to the requirements of the component parts to be driven. As a result, a high degree of independence of the motor device from the amplitude and the form of the supply voltage and the component parts to be driven is achieved, with the result that the motor device can be used for switch drives of different electric switches, for example for tensioning springs of the spring energy store drives of circuit breakers or for directly driving switching contacts of switch disconnectors. In particular, the number of motor variants for different switches can advantageously be reduced. Instead of different motors, a brushless three-phase motor is used for various switches. The use of a brushless three-phase motor has the advantage over other types of motors that it is subject to particularly low levels of wear since there is no need for any electrical contact with its rotor. Additionally, the invention advantageously reduces the complexity involved in making a change when subsequently adjusting the supply voltage. In terms of manufacturing technology, the fitting and wiring of different electrical components for monitoring and controlling the motor can advantageously be dispensed with. By virtue of the standardization associated with this, the probability of a fault during these manufacturing processes is also reduced.

One configuration of the invention envisages that the control device has a current-measuring unit for detecting a motor current flowing between the switching unit and the three-phase motor. This configuration of the invention advantageously enables monitoring of the motor current in order to identify overloads and malfunctions of the three-phase motor.

A further configuration of the invention envisages that the control device has a galvanic isolation unit for galvanically isolating the three-phase motor from the control device. For example, the galvanic isolation unit has a relay or a contactor for galvanically isolating the three-phase motor from the control device. This configuration of the invention advantageously makes it possible to switch off the three-phase motor safely in the event of an identified overload or malfunction.

A further configuration of the invention envisages that the control unit has an input assembly, via which input signals from at least one external apparatus are supplied to the control unit. In particular, input signals from a limit switch for detecting an end position of the switch drive are supplied to the control unit via the input assembly. This configuration of the invention advantageously makes it possible to process input signals which are relevant to the operation of the respective switch by means of the control unit. For example, the control device can thus respond to input signals such as locking demands for locking the switch drive and can switch off the three-phase motor, if required. Input signals from a limit switch for detecting an end position of the switch drive with respect to the switching unit make it possible in particular to monitor an end position of the switch drive by means of the control unit.

A further configuration of the invention envisages that the control unit has an output assembly, via which output signals are output to at least one external apparatus by the control unit. This configuration of the invention advantageously makes it possible to output a state of the three-phase motor and/or of the control device by means of the output signals and to further-process this in other assemblies, for example in conventional electrical control component parts.

A further configuration of the invention envisages that the switching unit has an electronic switching component for each phase of the three-phase motor, said switching component being actuable in pulse-width-modulated fashion by the control unit. This configuration of the invention makes it possible to generate a pulse-width-modulated AC drive voltage for the three-phase motor by actuation of an electronic switching component for each phase of the three-phase motor.

In the method according to the invention for operating a motor device according to the invention, a supply voltage of the motor device is rectified by the rectifier unit when the supply voltage is an AC voltage and polarity reversal protection is provided when the supply voltage is a DC voltage. In addition, the rectifier output voltage is detected by the voltage-measuring unit. A pulse-width-modulated AC drive voltage for the three-phase motor is generated from the rectifier output voltage by the switching unit, wherein the switching unit is actuated by the control unit depending on the rectifier output voltage. The advantages of the method according to the invention correspond to the advantages already mentioned above in respect of the motor device according to the invention.

One configuration of the method envisages that pulse width modulation signals are generated by the control unit for each phase of the three-phase motor, the duty cycles of said pulse width modulation signals being reciprocally proportional to an amplitude of the rectifier output voltage. The duty cycle is understood to mean the quotient of the pulse duration in a clock period and the period T of the clock periods of the pulse width modulation. The reciprocal proportionality of the duty cycles of the pulse width modulation with respect to the amplitude of the supply voltage of the motor device advantageously compensates for any differences in amplitude between different supply voltages, with the result that in each case the same power of the three-phase motor can be generated for different supply voltages.

A further configuration of the method envisages that pulse width modulation signals are generated by the control unit for each phase of the three-phase motor, the duty cycles of said pulse width modulation signals having been matched to a setpoint value for the power of the three-phase motor. As a result, the power of the three-phase motor can likewise be adjusted in an advantageous manner to the setpoint value of the power by the duty cycles of the pulse width modulation.

A further configuration of the method envisages that an amplitude of a motor current flowing between the switching unit and the three-phase motor is detected, and the three-phase motor is switched off when the detected amplitude of the motor current exceeds the amplitude threshold value. As a result, flow of an excessively high motor current can advantageously be prevented.

A further configuration of the method envisages that a time threshold value is preset, a time period during which a motor current flows between the switching unit and the three-phase motor is detected, and the three-phase motor is switched off when the detected time period exceeds the time threshold value. As a result, flow of the motor current over an excessively long time period can advantageously be prevented.

The above-described properties, features and advantages of this invention and the way in which they are achieved will become clearer and more easily understandable in connection with the following description of exemplary embodiments, which will be explained in more detail in connection with the drawings, in which:

DESCRIPTION OF THE INVENTION

Mutually corresponding parts have been provided with the same reference symbols in the figures.

Figure 1:
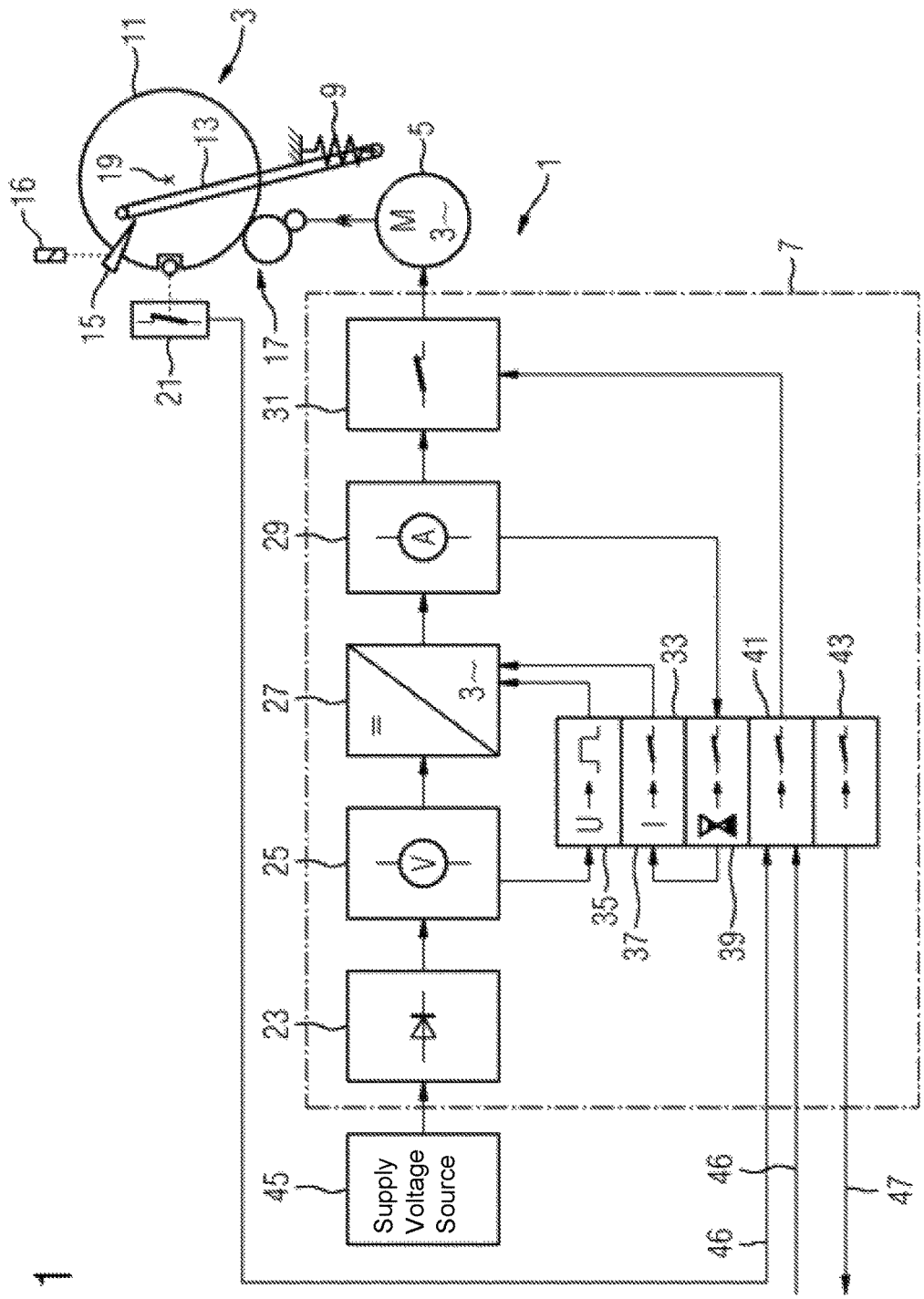
FIG. 1 shows a block diagram of a motor device and a switch drive of an electric switch.

FIG. 1 shows a block diagram of a switch drive 3 of an electric switch and a motor device 1 for the switch drive 3. The motor device 1 has a brushless three-phase motor 5 and an electronic control device 7 for controlling the three-phase motor 5. The switch drive 3 is a spring energy store drive and has a spring 9, a tensioning wheel 11, a coupling element 13 connecting the spring 9 to the tensioning wheel 11, a locking unit 15 and a release unit 16.

The three-phase motor 5 is coupled to the tensioning wheel 11 by a gear mechanism 17 in order to rotate the tensioning wheel 11 about an axis of rotation 19 in a first direction of rotation out of a first end position into a second end position. The coupling element 13 is in the form of a coupling rod, which is connected at one end to the tensioning wheel 11 and at the other end to the spring 9, with the result that the spring 9 is tensioned by a rotation of the tensioning wheel 11 about the axis of rotation 19 in the first direction of rotation.

As a result, the spring 9 can be tensioned by the three-phase motor 5. The tensioning wheel 11 can be locked by the locking unit 15 so that a rotation of the tensioning wheel 11 in a second direction of rotation, which is opposite to the first direction of rotation, is blocked in order to prevent unloading of the spring 9. For example, the locking unit 15 has a locking arm for this purpose, which stops the tensioning wheel 11 and/or the coupling element 13 in the second end position, in which the spring 9 is tensioned. The locking of the tensioning wheel 11 can be canceled by the release unit 16 in order to enable unloading of the spring 9. By virtue of the unloading of the spring 9, the tensioning wheel 11 is rotated out of the second end position into the first end position and a switching contact (not illustrated) of the switch is moved in order to interrupt a current path. The end positions of the tensioning wheel 11 are detected by a limit switch 21.

The control device 7 has a rectifier unit 23, a voltage-measuring unit 25, a switching unit 27, a current-measuring unit 29, a galvanic isolation unit 31 and a control unit 33. The control unit 33 has a pulse width modulation unit 35, a disconnection unit 37, a time-monitoring and current-monitoring unit 39, an input assembly 41 and an output assembly 43.

The rectifier unit 23 is connected to a supply voltage source 45, from where the motor device 1 is supplied a supply voltage U1, U2. The supply voltage source 45 is a single-phase or polyphase AC voltage source or a DC voltage source.

The supply voltage U1, U2 is rectified by the rectifier unit 23 when the supply voltage U1, U2 is an AC voltage, and polarity reversal protection is provided when the supply voltage U1, U2 is a DC voltage, with the result that a rectifier output voltage is output by the rectifier unit 23, said rectifier output voltage being a DC voltage with a preset polarity. A polarity, which deviates from the preset polarity, of a supply voltage U1, U2 which is a DC voltage or of a component of a supply voltage U1, U2 which is an AC voltage is converted to the preset polarity by the rectifier unit 23.

An amplitude of the rectifier output voltage is detected by the voltage-measuring unit 25. The voltage-measuring unit 25 is an electrical or electronic circuit for determining the amplitude of the rectifier output voltage and has, for example, a voltage divider.

A three-phase pulse-width-modulated AC drive voltage for the three-phase motor 5 is generated from the rectifier output voltage by the switching unit 27. For this purpose, the switching unit 27 is actuated by the control unit 33 depending on the amplitude of the rectifier output voltage which is detected by the voltage-measuring unit 25.

A motor current flowing between the switching unit 27 and the three-phase motor 5 is detected by the current-measuring unit 29. The current-measuring unit 29 has, for example, a transformer coil or a shunt resistor.

The three-phase motor 5 can be galvanically isolated from the control device 7 by the galvanic isolation unit 31. The isolation unit 31 has, for example, for each phase of the three-phase motor 5, a relay or a contactor for galvanically isolating a phase conductor of the phase from the control device 7.

Depending on the rectifier output voltage, pulse width modulation signals are generated for each phase of the three-phase motor 5 by the pulse width modulation unit 35 of the control unit 33, and said pulse width modulation signals are used to actuate the switching unit 27.

The motor current detected by the current-measuring unit 29 is evaluated by the time-monitoring and current-monitoring unit 39 of the control unit 33. In this case, an amplitude of the motor current and a time period during which the motor current flows are determined.

The motor current through the switching unit 27 is disconnected by the disconnection unit 37 of the control unit 33 when the amplitude of the motor current exceeds a preset amplitude threshold value or when the time period during which the motor current flows exceeds a preset time threshold value.

Input signals 46 from at least one external apparatus are supplied to the control unit 33 via the input assembly 41 of the control unit 33. In particular, input signals 46 from the limit switch 21 are supplied to the control unit 33 via the input assembly 41. Depending on input signals, the isolation unit 31 is activated by the input assembly 41 in order to galvanically isolate the three-phase motor 5 from the control device 7.

Output signals 47 are output to at least one external apparatus by the control unit 33 via the output assembly 43. For example, a state of the three-phase motor 5 and/or a state of the control device 7 and/or a state of the switch drive 3 is/are communicated using an output signal 47.

Figure 2:
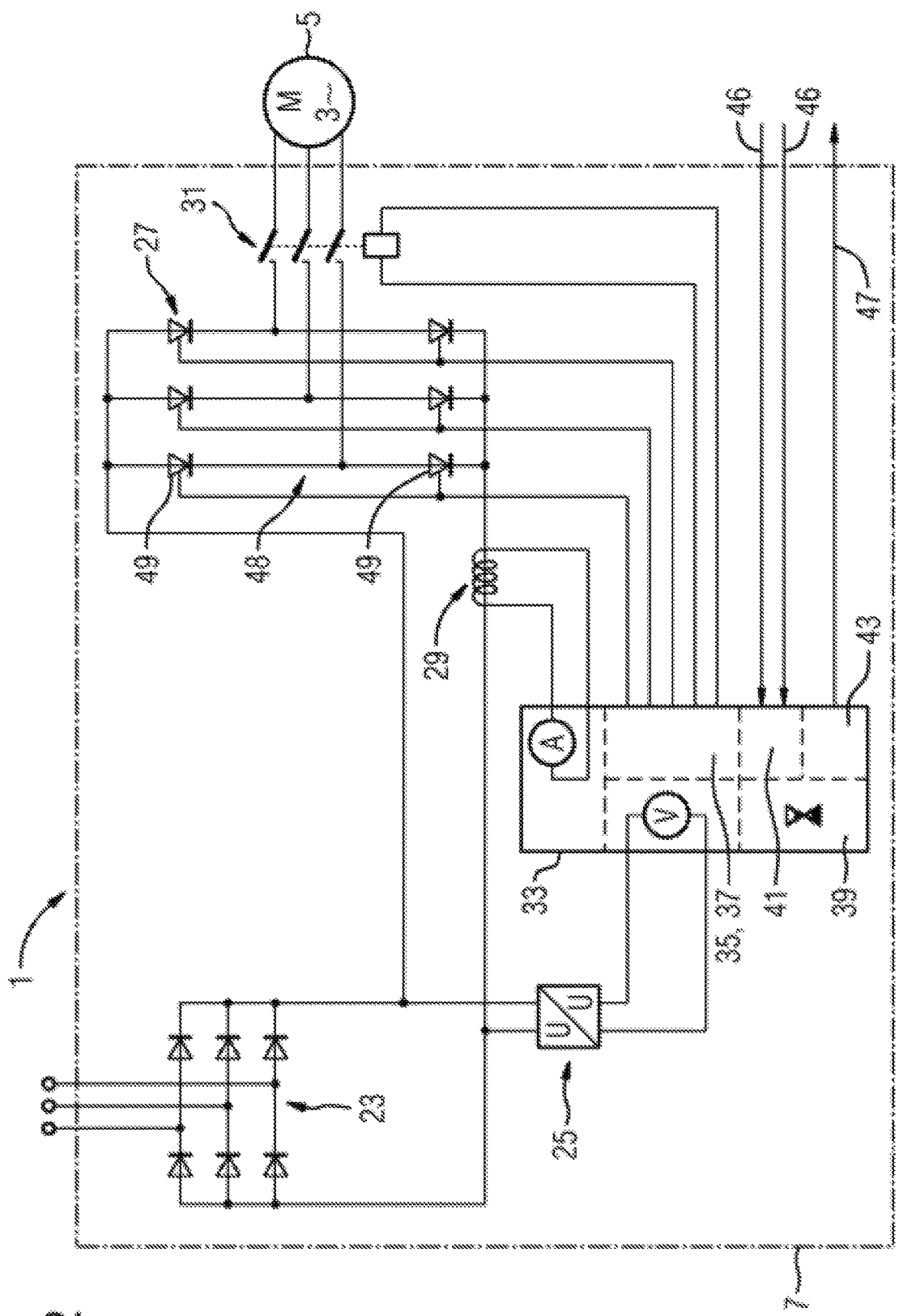
FIG. 2 shows a schematic circuit diagram of a motor device.

FIG. 2 shows a circuit diagram of an exemplary embodiment of a motor device 1. In this exemplary embodiment, the voltage-measuring unit 25 and the current-measuring unit 29 are integrated at least partially in the control unit 33. The switching unit 27 has an electronic switching component 48 for each phase of the three-phase motor 5, said switching component being actuable by the control unit 33. Each switching component 48 is in the form of a half-bridge comprising two electronic switching elements 49, which are actuable by the control unit 33.

Figure 3:
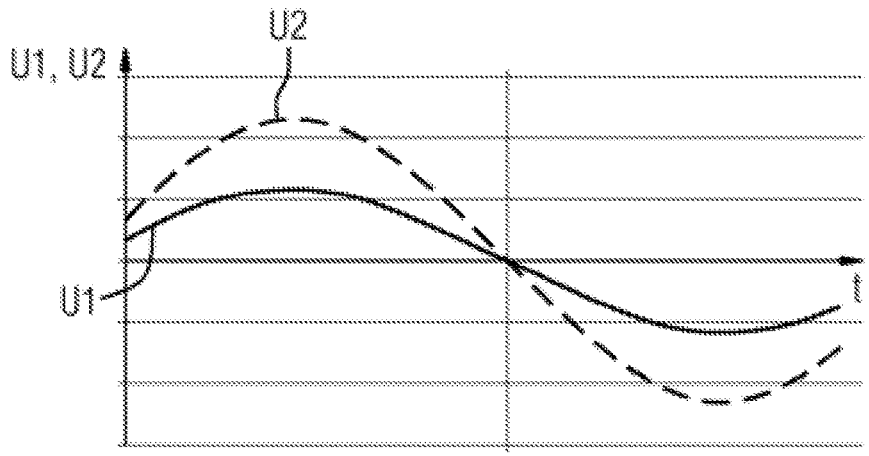
FIG. 3 shows voltage/time graphs for two supply voltages of a motor device and corresponding pulse-width-modulated phase voltages of a three-phase motor of the motor device.

FIG. 3 shows, by way of example, voltage/time graphs of two different supply voltages U1, U2 of the motor device 1 and two pulse-width-modulated phase voltages P1, P2 of a phase of the three-phase motor 5 of the motor device 1 as a function of time t. Both supply voltages U1, U2 are single-phase sinusoidal AC voltages. A first supply voltage U1 has an amplitude which is half the magnitude of that of the second supply voltage U2.

The first pulse-width-modulated phase voltage P1 is generated from the rectified first supply voltage U1 by the switching unit 27. The second pulse-width-modulated phase voltage P2 is generated from the rectified second supply voltage U2 by the switching unit 27.

The pulse-with-modulated phase voltages P1, P2 differ from one another in terms of the pulse levels of the rectangular pulses and the duty cycles in the individual clock periods of the pulse width modulation. The duty cycle in a clock period is understood to mean the quotient of the pulse duration in the clock period and the period T of the clock periods. The duty cycle is sinusoidally modulated as a function of time t in order to generate a sinusoidal drive voltage for the three-phase motor 5. The frequency of this modulation of the duty cycle is generally different than the frequency of the respective supply voltage U1, U2 and is fixed by the setpoint value for the frequency of the sinusoidal drive voltage to be generated for the three-phase motor 5 (in the example illustrated in FIG. 3, the supply voltages U1, U2 and the sinusoidal drive voltage to be generated for the three-phase motor 5 have the same frequency, however).

The pulse level of the rectangular pulses is necessarily proportional to the amplitude of the supply voltage U1, U2. Therefore, the pulse level of the rectangular pulses of the first pulse-width-modulated phase voltage P1 is half the magnitude of the pulse level of the rectangular pulses of the second pulse-width-modulated phase voltage P2.

The duty cycles in the individual clock periods are reciprocally proportional to the amplitude of the supply voltage U1, U2, with the result that the duty cycle in a clock period of the first pulse-width-modulated phase voltage P1 is in each case twice the magnitude of the duty cycle in the corresponding clock period of the second pulse-width-modulated phase voltage P2. The duty cycles for the respective supply voltage U1, U2 are determined by the pulse width modulation unit 35 of the control unit 33 depending on the rectifier output voltage of the rectifier unit 23 and are processed to form pulse width modulation signals, by means of which the switching unit 27 is actuated.

The reciprocal proportionality of the duty cycles of the pulse width modulation with respect to the amplitude of the supply voltage U1, U2 of the motor device 1 compensates for any differences in amplitude of different supply voltages U1, U2, with the result that in each case the same power of the three-phase motor 5 is generated for different supply voltages U1, U2. The duty cycles of the pulse width modulation are also matched to a setpoint value for the power of the three-phase motor 5.

Figure 4:
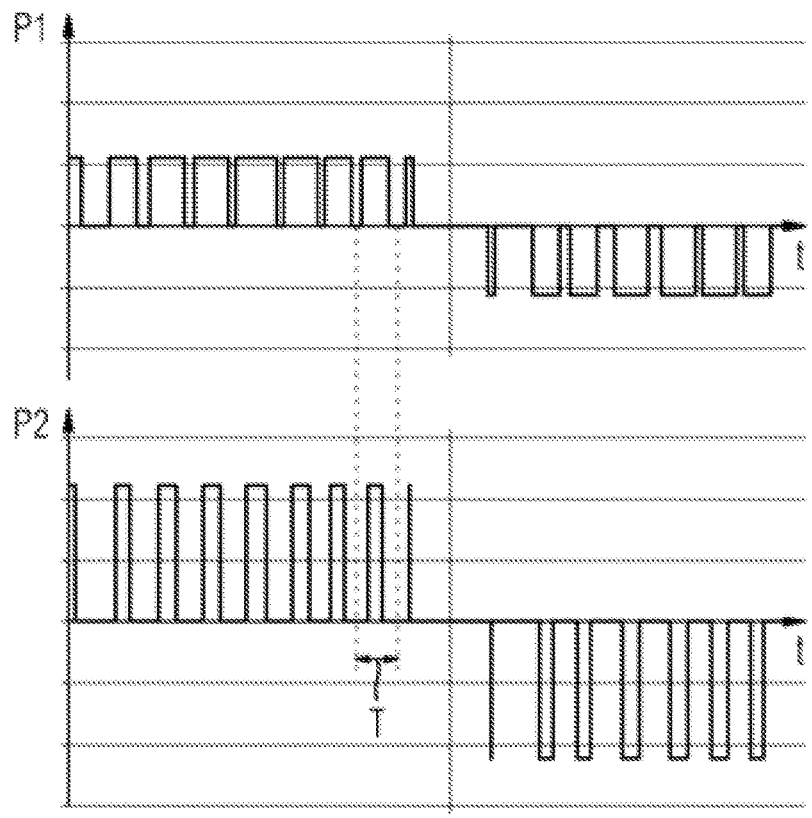
FIG. 4 shows a flowchart of a method for operating a motor device.
Figure 4:
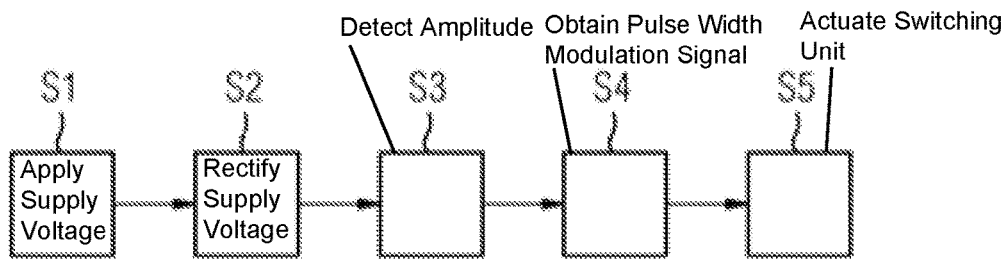

FIG. 4 shows a flowchart of a method for operating a motor device 1. In a first method step S1, a supply voltage U1, U2 is applied to an input of the control device 7. In a second method step S2, the supply voltage U1, U2 is rectified by the rectifier unit 23 when the supply voltage U1, U2 is an AC voltage or the polarity of said supply voltage is changed when the supply voltage U is a DC voltage of reverse polarity. In a third method step S3, the amplitude of the rectifier output voltage is detected by the voltage-measuring unit 25. In a fourth method step S4, the duty cycles and period T of the pulse width modulation are parameterized by the pulse width modulation unit 35 of the control unit 33 depending on the detected rectifier output voltage and converted into a pulse width modulation signal for actuating the switching unit 27. In a fifth method step S5, the switching unit 27 is actuated by the pulse width modulation signal, and a three-phase pulse-width-modulated AC drive voltage for the three-phase motor 5 is generated from the rectifier output voltage by the switching unit 27, and said AC drive voltage is used to drive the three-phase motor 5.

Although the invention has been illustrated more closely and described in detail using preferred exemplary embodiments, the invention is not restricted by the disclosed examples and other variations can be derived herefrom by a person skilled in the art without departing from the scope of protection of the invention.

The invention claimed is:

1. A motor assembly for a switch drive of an electric switch, the motor assembly comprising:
    a brushless three-phase motor;
    an electronic controller for controlling said brushless three-phase motor, said electronic controller having:
        a rectifier for rectifying a supply voltage of the motor assembly when the supply voltage is an AC voltage and for polarity reversal protection when the supply voltage is a DC voltage;
        a voltage-measuring meter for detecting a rectifier output voltage of said rectifier;
        a switch for generating a pulse-width-modulated AC drive voltage for said brushless three-phase motor from the rectifier output voltage; and
        a further controller for actuating said switch depending on the rectifier output voltage.

2. The motor assembly according to claim 1, wherein said electronic controller has a current-measuring meter for detecting a motor current flowing between said switch and said brushless three-phase motor.

3. The motor assembly according to claim 1, wherein said electronic controller has a galvanic isolator for galvanically isolating said brushless three-phase motor from said electronic device.

4. The motor assembly according to claim 3, wherein said galvanic isolator has a relay or a contactor for galvanically isolating said brushless three-phase motor from said electronic controller.

5. The motor assembly according to claim 1, wherein said further controller has an input, via which input signals from at least one external apparatus are supplied to said further controller.

6. The motor assembly according to claim 5, wherein the input signals from a limit switch for detecting an end position of the switch drive are supplied to said further controller via said input.

7. The motor assembly according to claim 1, wherein said further controller has an output, via which output signals are output to at least one external apparatus by said further controller.

8. The motor assembly according to claim 1, wherein said switch has an electronic switching component for each phase of said brushless three-phase motor, said electronic switching component being actuable in pulse-width-modulated fashion by said further controller.

9. A method for operating a motor assembly having a brushless three-phase motor and an electronic controller for controlling the brushless three-phase motor, the electronic controller having a rectifier unit, a voltage-measuring meter, a switch, and a further controller, which comprises the steps of:
    rectifying a supply voltage of the motor assembly by the rectifier unit when the supply voltage is an AC voltage and polarity reversal protection is provided when the supply voltage is a DC voltage;
    detecting a rectifier output voltage by the voltage-measuring meter;
    generating a pulse-width-modulated AC drive voltage for the brushless three-phase motor from the rectifier output voltage by the switch;
    actuating the switch by the further controller depending on the rectifier output voltage.

10. The method according to claim 9, which further comprises generating pulse width modulation signals by the further controller for each phase of the brushless three-phase motor, duty cycles of the pulse width modulation signals being reciprocally proportional to an amplitude of the rectifier output voltage.

11. The method according to claim 9, which further comprises generating pulse width modulation signals by the further controller for each phase of the brushless three-phase motor, duty cycles of the pulse width modulation signals having been matched to a setpoint value for a power of the brushless three-phase motor.

12. The method according to claim 9, wherein:
    an amplitude threshold value is preset;
    an amplitude of a motor current flowing between the switch and the brushless three-phase motor is detected; and
    the brushless three-phase motor is switched off when a detected amplitude of a motor current exceeds an amplitude threshold value.

13. The method according to claim 9, wherein:
    a time threshold value is preset;
    a time period during which a motor current flows between the switching unit and the brushless three-phase motor is detected; and
    the three-phase motor is switched off when the time period exceeds the time threshold value.

* * * * *